US012210160B2

(12) United States Patent
Sarris

(10) Patent No.: US 12,210,160 B2
(45) Date of Patent: Jan. 28, 2025

(54) SYSTEM TO SUPERIMPOSE INFORMATION OVER A USERS FIELD OF VIEW

(71) Applicant: Alexander Sarris, Silver Spring, MD (US)

(72) Inventor: Alexander Sarris, Silver Spring, MD (US)

(*) Notice: Subject to any disclaimer, the term of this patent is extended or adjusted under 35 U.S.C. 154(b) by 0 days.

(21) Appl. No.: 18/069,190

(22) Filed: Dec. 20, 2022

(65) Prior Publication Data

US 2024/0036318 A1     Feb. 1, 2024

Related U.S. Application Data

(60) Provisional application No. 63/291,967, filed on Dec. 21, 2021.

(51) Int. Cl.
*G02B 27/01* (2006.01)
*G06F 3/01* (2006.01)

(52) U.S. Cl.
CPC ......... *G02B 27/0172* (2013.01); *G06F 3/012* (2013.01); *G06F 3/013* (2013.01); *G02B 2027/0123* (2013.01)

(58) Field of Classification Search
CPC ........ G02B 27/0172; G02B 2027/0123; G02B 27/017; G02B 2027/0138; G02B 2027/014; G02B 2027/0187
See application file for complete search history.

(56) References Cited

U.S. PATENT DOCUMENTS

| | | |
|---|---|---|
| 6,219,186 B1 | 4/2001 | Hebert |
| 6,945,648 B2 | 9/2005 | Schindler et al. |
| 9,025,252 B2 | 5/2015 | Lewis et al. |
| 9,063,330 B2 | 6/2015 | LaValle et al. |
| 9,170,425 B1 | 10/2015 | Harrison et al. |
| 9,304,319 B2 | 4/2016 | Bar-Zeev et al. |
| 9,250,444 B2 | 11/2016 | Magyari |
| 9,494,800 B2 | 11/2016 | Border et al. |
| 9,946,075 B1 | 4/2018 | Hu |
| 9,983,412 B1 | 5/2018 | Fuchs et al. |
| 10,054,774 B2 | 8/2018 | Cook |
| 10,394,322 B1* | 8/2019 | Gotsch ............... G06F 1/1637 |
| 10,477,157 B1 | 11/2019 | Shahdi et al. |
| 10,706,600 B1 | 7/2020 | Yoon et al. |
| 10,921,598 B2* | 2/2021 | Suzuki ............... G02B 27/0172 |
| 11,461,936 B2 | 10/2022 | Freeman et al. |
| 11,475,650 B2 | 10/2022 | Berliner et al. |
| 11,483,569 B1* | 10/2022 | Arya .................... H04N 7/0117 |
| 11,494,997 B1 | 11/2022 | Ho |
| 11,500,207 B2 | 11/2022 | Haddick et al. |
| 2004/0004584 A1 | 1/2004 | Hebert |
| 2006/0028400 A1* | 2/2006 | Lapstun ............... G02B 27/0093 |
| | | 345/8 |
| 2009/0189974 A1 | 7/2009 | Deering |

(Continued)

*Primary Examiner* — Amy Onyekaba
(74) *Attorney, Agent, or Firm* — Vance Intellectual Property PC

(57) ABSTRACT

The present invention relates to novel virtual reality (VR), augmented reality (AR), and mixed reality (MR) systems for providing a user additional information that was previously invisible to the naked eye. More specifically, the invention relates to a system that is capable of overlaying information onto human vision such that the user can see both the environment around them, and the information superimposed over it.

15 Claims, 11 Drawing Sheets

(56) References Cited

U.S. PATENT DOCUMENTS

| | | |
|---|---|---|
| 2011/0214082 A1 | 9/2011 | Osterhout et al. |
| 2012/0194418 A1 | 8/2012 | Osterhout et al. |
| 2012/0194419 A1 | 8/2012 | Osterhout et al. |
| 2012/0194420 A1 | 8/2012 | Osterhout et al. |
| 2012/0194549 A1 | 8/2012 | Osterhout et al. |
| 2012/0194550 A1 | 8/2012 | Osterhout et al. |
| 2012/0194551 A1 | 8/2012 | Osterhout et al. |
| 2012/0194552 A1 | 8/2012 | Osterhout et al. |
| 2012/0194553 A1 | 8/2012 | Osterhout et al. |
| 2012/0200488 A1 | 8/2012 | Osterhout et al. |
| 2012/0200499 A1 | 8/2012 | Osterhout et al. |
| 2012/0200601 A1 | 8/2012 | Osterhout et al. |
| 2012/0206322 A1 | 8/2012 | Osterhout et al. |
| 2012/0206323 A1 | 8/2012 | Osterhout et al. |
| 2012/0206334 A1 | 8/2012 | Osterhout et al. |
| 2012/0206335 A1 | 8/2012 | Osterhout et al. |
| 2012/0206485 A1 | 8/2012 | Osterhout et al. |
| 2012/0212406 A1 | 8/2012 | Osterhout et al. |
| 2012/0212414 A1 | 8/2012 | Osterhout et al. |
| 2012/0218301 A1 | 8/2012 | Miller |
| 2012/0235883 A1 | 9/2012 | Border et al. |
| 2012/0235886 A1 | 9/2012 | Border et al. |
| 2012/0235887 A1 | 9/2012 | Border et al. |
| 2012/0235900 A1 | 9/2012 | Border et al. |
| 2012/0236030 A1 | 9/2012 | Border et al. |
| 2012/0242678 A1 | 9/2012 | Border et al. |
| 2012/0242697 A1 | 9/2012 | Border et al. |
| 2012/0242698 A1 | 9/2012 | Haddick et al. |
| 2012/0249797 A1 | 10/2012 | Haddick et al. |
| 2013/0127980 A1 | 5/2013 | Haddick et al. |
| 2014/0218281 A1* | 8/2014 | Amayeh ............... A61B 3/14 345/156 |
| 2014/0361976 A1* | 12/2014 | Osman ............. G02B 27/017 345/156 |
| 2015/0002374 A1 | 1/2015 | Erinjippurath et al. |
| 2015/0312561 A1 | 10/2015 | Hoof et al. |
| 2018/0268518 A1 | 9/2018 | Nourai et al. |
| 2018/0270474 A1 | 9/2018 | Liu |
| 2018/0335629 A1* | 11/2018 | Cheng ............. G02B 27/0093 |
| 2019/0025587 A1 | 1/2019 | Osterhout et al. |
| 2019/0094981 A1 | 3/2019 | Bradski et al. |
| 2019/0204601 A1 | 7/2019 | Ha et al. |
| 2019/0339515 A1 | 11/2019 | Thakur et al. |
| 2021/0255458 A1* | 8/2021 | Yoon ............. G02B 27/0172 |
| 2021/0349322 A1 | 11/2021 | Harris et al. |
| 2021/0389590 A1 | 12/2021 | Freeman et al. |
| 2022/0392175 A1 | 12/2022 | Freiwirth |
| 2024/0012245 A1* | 1/2024 | Adema ............. G02B 27/0176 |

* cited by examiner

SYSTEM TO SUPERIMPOSE INFORMATION OVER A USERS FIELD OF VIEW

FIELD OF THE INVENTION

The field of the present invention relates to novel virtual reality (VR), augmented reality (AR), and mixed reality systems (MR) for providing information that may be invisible to a user's naked eye. More specifically, the invention relates to a system that is capable of overlaying information onto human vision such that the user can see both the environment around them, and the information superimposed over it.

CROSS REFERENCE TO RELATED APPLICATIONS

This application is entitled to priority pursuant to 35 U.S.C. § 119(e) to U.S. provisional patent application No. 63/291,967, filed on 21 Dec. 2021 and titled "NOVEL SYSTEM TO SUPERIMPOSE INFORMATION OVER A USER'S FIELD OF VIEW." The entire contents of which are incorporated herein by reference in its entirety.

BACKGROUND

Night vision technology—devices that allow images to be produced in levels of light approaching total darkness—was first tested during World War II and began seeing widespread use in military applications during the Vietnam War. Various types of this technology are also used in police and military operations, as well as hunting. The technology involves transforming certain types of electromagnetic radiation, such as near-wave infrared, longwave infrared, or very low levels of visible, such that a user can clearly perceive the portion of the environment illuminated by the radiation. Night vision technology primarily uses the visible and near-wave infrared portions of the electromagnetic spectrum, amplifying light that is already illuminating the environment, even if it is too dim for the naked eye to see. Thermal imaging technology, sometimes viewed as a subset of night vision technology, primarily uses the portions of the electromagnetic spectrum that involve near-wave infrared and longwave infrared wavelengths, and will successfully operate in environments where there is no radiation from the visible portion of the electromagnetic spectrum. This type of technology is also used in hunting and in police and military operations, as well as firefighting, electrical utilities, research, inspections, and more. Both technologies are often used in devices worn on the head, although they can also be incorporated into weapon sights, monocular devices, bi-ocular devices, binocular devices, phone attachments, or other handheld devices. Over time, thermal imaging technology has become more widespread, accessible, and sophisticated. Multiple new industries are finding uses for it, prices for individual devices are going down, and developers can fit more functionality into smaller packages. However, these improvements do not bely the fact that there are several problems with night vision and thermal imaging technology that still have to be solved.

Night vision and thermal imaging devices are by and large big, bulky, and difficult to use for long periods of time. This is especially apparent for head-mounted devices, where there have been reported complaints of neck pains after prolonged periods of use. In many instances, counterweights need to be mounted on the back of users' heads to keep the device from pulling their heads forward. Many existing wearable systems often use their power supply as a counterweight to redistribute the weight of the system. However, these systems can still be very heavy. Most devices that do not face these problems avoid the problems because they are not head mounted. The devices in question are usually handheld, taking the form of monoculars, bi-oculars, binoculars, gun-like devices that are pointed at what the user wants to measure, smartphone attachments, or smartphone-sized pocket devices. While some of these devices can be mounted on headsets, they still face the original problem.

Image clarity of wearable and handheld night vision and thermal imaging devices is also a problem. While high-resolution sensors do exist, they generate a lot of heat during use, which necessitates some form of cooling unit to keep devices that use these sensors from overheating. A cooling unit adds a lot of weight to the device that requires it, which exacerbates the size and weight problem described earlier. As a result, most of the wearable and handheld night vision and thermal imaging devices use lower-resolution sensors. This allows the devices to function without bulky cooling units, but a lower image resolution may mean decreased image clarity.

Another problem with wearable and handheld night vision and thermal imaging devices, which builds off the image clarity problem, involves the field of view (hereafter referred to as "FOV") of the device in question. Because of the low sensor resolution, many wearable and handheld night vision and thermal imaging devices in use today are designed to help a user observe things at a distance, which requires a narrower FOV for the device in question to render increased detail of a smaller area. While faraway objects can be rendered in high detail with a narrow FOV, these devices are not as useful in situations where a wider FOV and higher image detail are desired. Examples include electrical inspection, where a wider FOV enables easier inspection of electrical utilities, firefighting, where a wider FOV enables faster search/rescue and better situational awareness, and close-quarter military applications where a wider FOV and peripheral vision are vital to survival. One type of device used by the United States Air Force, known as "panoramic night-vision goggles" (PVNGs), doubles the user's field of view by using four image-intensifier tubes instead of the usual two in binocular night vision goggles. However, using more sensing devices makes the PVNGs much bigger/bulkier than average, contributing to the size/weight problem discussed already. Some newer night vision and thermal imaging sensors do have wider FOV's with higher resolution, but devices incorporating this technology are not yet widely available.

Another problem with wearable night vision and thermal imaging devices involves their energy consumption. This problem is most apparent in devices that contain higher-resolution sensors. Higher-resolution sensors require more electricity for complete functionality, and in turn require more computing power to process all the information measured by the sensor. This problem is exacerbated even more if the sensor is of a high enough resolution to require a cooling system, which in turn requires a source of electricity to run properly. Since most of the night vision and thermal imaging devices rely on batteries, a higher energy consumption means faster battery drainage, which in turn means that the use of the device in question will have to be paused until the battery or batteries can be replaced or sufficiently recharged.

Many of these problems extend not just to night vision and thermal imaging technology, but to other areas as well. These areas include the developing fields of VR, AR, and MR, which are starting to be viewed with increasing interest, and which may contain possible solutions to problems involving night vision and thermal imaging technology.

VR, AR, and MR systems are fast-growing fields of interest in a variety of industries and usually involve interactive experiences in simulated environments, real-world environments, or a combination of simulated and real-world environments. These systems can provide visual, audial, and/or tactile information to the user that would otherwise be invisible to the naked eye and that allows them to understand more about and/or to interact more fully with the environment around them. In general, such systems include, but are not limited to, at least one method of gathering or generating information about the surrounding environment, at least one method of processing the gathered or generated information such that the final result will directly or indirectly allow the user to understand more about the environment around them, and at least one method of conveying the processed information such that the user will directly or indirectly gain a greater awareness of the environment around them.

To make VR, AR, and MR environments as realistic to the user as possible, multiple methods are often used to gather information from or generate information about the surrounding environment. These methods can involve the application of one or more sensors or detectors, such as image sensors, laser scanners, ultrasonic sensors, microphones, pressure sensors, and others, or the application of various software programs used in conjunction with or as a replacement to sensors of the types mentioned previously. The resulting information is processed and used to generate environments for users to experience in VR, AR, and/or MR, using one or more devices that include headsets, haptic feedback systems, and other devices or systems.

One of the primary methods to for users to experience VR, AR, or MR environments involves the use of specific devices known as head (or helmet)—mounted (or worn) displays, hereafter referred to as "HMDs" or "HWDs"). These devices facilitate the transmission of information to the user's eye or eyes such that the user can gain a greater understanding of the environment from this information, often in the form of text or images. There are various ways to transmit this information to the eye, most of which involve an image source, a transmission medium, and a set of focusing optics. The image source is often a type of display device, such as a liquid crystal display (LCD), thin-film-transistor liquid crystal display (TFT LCD), organic light emitting diode (OLED) display, liquid crystal on silicon (LCOS) display, ferroelectric liquid crystal on silicon (FLCoS) display, digital micromirror display (DMD), or others. There are multiple types of optical components that could be used to position the information sent from the image source such that the user can perceive or understand the information sent to the user's eye or eyes. These optics can include any form of or combination of lenses, mirrors, beam-splitters, holographic waveguides, retinal projection technology, and any other type of optics or optical system.

However, the current methods of creating interactive experiences in VR, AR, and MR suffer from a variety of drawbacks that can directly or indirectly interfere with the information about the surrounding environment that is being conveyed to the user. For example, one drawback involves the optical systems used to convey visual information about the surrounding environment to the user's eyes in terms of the size of the FOV in which the user can perceive visual information. Generally, optical systems are designed to provide the user with as wide an FOV as possible, but the FOV is still limited by the type of optics used. For example, holographic waveguides, while being very thin and compact, are only able to provide a narrow FOV to the user. Lenses and mirrors, in contrast, may be designed to provide the user with a very wide field of view. However, designing optical components to provide the user with a wider FOV in which additional visual information may be perceived could also exacerbate various optical aberrations inherent to each type of component.

When transmitting optical information to a user, there are many types of optical aberration that should be accounted for, as these aberrations often make it more difficult for a user to successfully immerse themselves in a VR, AR, or MR environment. Various types of optical systems are accompanied by various types of aberrations, such as chromatic aberration, spherical aberration, image curvature, coma, astigmatism, distortion, and others. Correcting these aberrations usually involves designing more complicated optics engineered to correct aberration(s) that may occur between the visual information source and destination. However, designing more complicated optics could also reduce the size of the FOV in which the user can perceive visual information, as well as increase the size and weight of the system.

Another problem with transmitting visual information to a user involves the ability of the user to perceive the visual information. This problem, known as the "vergence-accommodation conflict" (hereafter referred to as "VAC"), is relatively common in VR, AR, and MR systems that involve HMDs, and is present in stereoscopic displays in general. VAC occurs when the brain receives mismatching cues between the distance of a virtual three-dimensional object and the focusing distance required for the user's eye or eyes to focus on that object. These mismatching cues increase the amount of time it takes the eyes to focus when switching from focusing on a nearby object to a faraway object. This can lead to users experiencing disorientation, nausea, or visual fatigue (asthenopia) during use, which may even result in some users experiencing side-effects that persist even after they stop using the system in question. This problem can be extremely debilitating in real-life scenarios involving firefighting, police operations, or military operations, as real-time information is incredibly vital to in said scenarios. Any distractions or delays could severely compromise the chances of success.

Another drawback of many VR, AR, and MR systems involves the number of input devices that each type of system utilizes and the computational capabilities available to each type of system. In this context, "computations" are calculations or algorithms that can manipulate received data values in some way and output the result, or output new data generated by running one or more analyses on received data. To develop a completely immersive experience for the user, many VR, AR, and MR systems utilize multiple image sensors or other measurement devices that may be used to scan the surrounding environment. The information captured by these devices is often used in areas such as head tracking—locating where the user is facing in the environment, hand tracking—locating where the user's hands are placed in the environment, surface reconstruction—locating surfaces on which to place holograms, and more. One of the many possible uses for this information is to superimpose information in a user's FOV such that the information appears on, over, or around various articles in the environment. While having this capability can greatly improve a user's experience with a VR, AR, or MR system, using it requires existing systems to have a large amount of computational capability to process the measured information about the environment either very quickly or in real-time. Processing the measured information very quickly or in real-time means that the user will not experience much "lag" or "latency"—a delay between events occurring in the surrounding environment and the superimposing of the processed information over various articles in the environment. This is especially important when the superimposed information consists of one or more images or video feeds, such as those from a camera, placed over a portion of the environment around the user, over the field of view of one or both of a user's eyes, or over other locations not described here. While having a high computational capability enables more functionality in a system, and while computational capabilities of technology are still increasing, there is still a physical limitation on the size of the electronics performing the computations, how fast computations may run and on how much information may be stored on a system. Also, processes that involve a lot of computations often require more time to complete. A long-enough delay between processing and superimposing data over a user's FOV could be disorienting or confusing if the user is relying on real-time data and is engaged in a task where time is of the essence.

Another drawback that is indirectly related to the computational requirement discussed above involves the rate of energy consumption of VR, AR, and MR systems. Energy consumption is especially important for those systems that include headsets or other devices that are not tethered to a constant energy supply. Systems that fall into this category usually receive power from one or more portable energy supplies that consist of electrochemical cells or other similar devices. Being powered by electrochemical cells or other similar devices means that the user will either eventually need to stop using their system to replace its portable energy supply, or connect the system through a tether to a constant energy supply that can either run the system as a replacement or recharge the portable energy supply such that the user will eventually be able to disconnect the tether and use the portable energy supply as the main energy source to the system again. Many of today's VR, AR, and MR systems include features that require many fast-running computations to process all the measured information, which in turn require a large amount of energy consumed at a high rate to run the devices performing said computations. While computational requirements are not the sole factor in determining the rate of energy consumption of VR, AR, and MR systems, they do play a substantial role.

Therefore, a need exists in the field for novel VR, AR, and MR systems that can provide a user with a wide FOV in which to perceive superimposed information about the area of the environment encompassed by the FOV. A further need exists for VR, AR, and MR systems that transmit information to a user's eyes using uncomplicated optical systems that help users avoid issues like VAC and optical aberrations like those described herein. There is also a need for VR, AR, and MR systems that can provide a large amount of visual information to the user with little to no delay between measuring information about the surrounding environment and providing visual information to the user in a form that may be understood. Finally, there is also a need for VR, AR, and MR systems that consume energy at a low rate, while still being able to meet the computational resource requirements necessary to provide a user with information about their surrounding environment that is not visible to the naked eye.

Various groups have developed systems or devices with the goal of mitigating one or more of the problems with night vision and thermal imaging devices, as well as VR, AR, and MR systems. However, each proposed solution has its own drawbacks, and none of them individually address all the problems that are described herein.

US Patent Publication 2019/0204601 A1 describes a device that allegedly uses a series of pinpoint mirrors to widen the FOV of a virtual image before presenting said image to a user, as well as avoiding chromatic aberrations that may be present with other types of optics. While this device does seem to widen the FOV of the image presented to a user, it is unclear if the image is magnified in the process, which would not necessarily allow more information to be shown to the user unless the objects being presented to the user from the image source are reduced in size before being transmitted. It is also unclear if the curved element specified would distort the image being projected to the user, requiring the display device or another system to compensate for this distortion before transmitting the image. Additionally, it is unclear how this invention solves other problems with VR, AR, and MR systems, and it is also unclear how this invention would interface or interact with sensors that take measurements of the surrounding environment.

U.S. Pat. No. 9,250,444 B2 relates to a device that supposedly uses only reflective components to present information to a user by reflecting optical information from a visual display source into the eye of the user. Their invention is designed to work in both VR and AR systems and provides a wide FOV to the user. Many aspects of this invention may appear to take the form of bi-ocular or monocular systems. Their claims are very extensive, focusing on various aspects of the invention. However, while mentioning the surrounding environment multiple times in the patent, these mentions appear to always be in the context of viewing the surrounding environment. This invention does not appear capable of taking measurements from the surrounding environment and providing the user with the resulting.

U.S. Pat. No. 6,945,648 B2 describes a basic HMD device. Their patent appears to focus on different methods of assembly, primarily involving ways to attach the HMD in question to a pair of glasses. It does not focus on the internal design process of the HMD, nor does it discuss in detail the source of optical information presented to the user, nor does it really discuss the myriad of issues currently facing VR, AR, and MR systems.

US Patent Publication 2018/0268518 A1 relates to a method for generating warped visual information by transforming it from a source, determining how to store this information in a memory location, and the process of storing the information. This patent focuses primarily on software, although it also describes aspects of various parts of VR, AR, and MR systems. These systems include various components, including devices whose function may involve measuring various aspects of the surrounding environment and/or recording images/video, as well as a control subsystem, an AR subsystem, and a display system. This patent does not discuss any required placement of components to achieve a desired result. It also does not once mention bi-ocular VR, AR, or MR systems. Instead, it just covers general VR, AR, MR, monocular, and binocular systems, and various hardware and software components that may comprise such systems. It also does not appear to mention an actual design process for the invention described in the patent.

U.S. Pat. No. 6,219,186 B1 describes a single-display bi-ocular system to view images and video using low-cost lightweight plastic optics that include both mirrors and lenses. This patent seems to be intended for use of the invention in medical remote imaging for surgical procedures. But, with the use of the complicated optics in this invention, it is unclear if this invention is able to avoid VAC or other problems that face VR, AR, and MR devices.

US Patent Publication 2004/0004584 A1 discusses an HMD that uses a bi-ocular lens assembly to relay an image from a display device through a split-field exit aperture onto binocular optical paths comprising both lenses and mirrors. It is unclear if the display device component shows the same image on its left and right halves such that each eye receives the same image adjusted as needed, or if the image is split in half such that each eye receives half of the image. While it is mentioned that this device should provide the user a wider field of view and less eyestrain, it is unclear if this device can eliminate eyestrain. This patent also does not contain any mention of measuring information from the surrounding environment, nor is it clear if the device is able to avoid the problem of VAC.

U.S. Pat. No. 9,170,425 B1 is for a passive "multifocal augmented reality lens", designed to let a user clearly see virtual objects at locations both near and far from the user, instead of restricting virtual images to a specific distance in front of the user's eye. Clearly intended to help solve the problem of VAC by making it easier for a user to switch between focusing on virtual objects and the surrounding environment, it still does not appear to completely solve the problem.

U.S. Pat. No. 9,494,800 B2 describes a "see-through computer display system" with a wide field of view, involving various methods and systems, and refer to it generally as a head-worn computing (HWC) system. It seems as if the inventors tried to cover as many aspects of an AR HWC system design as possible. Its detailed description includes various ways to measure the surrounding environment, various methods of control and communication, various usage and implementation scenarios, various system accessories, and very detailed descriptions of various aspects of hardware components that could comprise an AR HWC system, focusing especially on optical component configurations. The patent does not mention VR or MR systems, neither does it mention the words "monocular", "biocular", or "binocular". The patent also does not appear to describe design processes or equations for calculating various parameters of their invention. While they do describe various sensors that could be used to collect information from the surrounding environment, as well as some ways to overlay this information onto the user's FOV, it appears that the process for overlaying this information is relatively complex and does not reduce the requirements for high computational power. The patent does not appear to discuss a design process that directly relates sensor placement to the placement of optical components responsible for transmitting information to a user.

U.S. Pat. No. 10,054,774 relates to an optical system that consists of five mirrors and has a wide field of view. FIG. 2 in this patent seem extremely similar to the ones in U.S. Pat. No. 9,250,444, and FIG. 4 is indeed noted as prior art, although the exact document it came from is unclear. Based on the background section, it seems as if this invention is meant for use in telescopes, but it does not focus solely on this application area. The patent itself does not appear to be wide-ranging in what it covers, focusing mainly on various design parameters, characteristics, and aspects of the optical system. It also appears to limit itself by focusing on five-mirror configurations and not going into more detail about aspects with different numbers of mirrors.

US Patent Publication 2019/0339515) describes a technique or method to expand the pupil of an optical apparatus through the use of one or more beam splitters and waveguides. The patent appears to be narrow in scope, focusing on various aspects and aspects of the pupil-expanding apparatus and the components comprising it. What is disclosed does not appear to extend into environmental monitoring or the broader areas of VR, AR, or MR.

US Patent Publication 2019/0025587 A1 is for augmented reality glasses capable of allowing a user to view and interact with a surrounding environment and displayed information, that also "includes event and user action control of external applications". While the patent's Summary and Detailed Description are extremely wide-ranging in what they describe, virtually all the described embodiments and proposed use cases covered in this patent would require a very high amount of computational power, especially those involving video or image processing to alter images or datasets prior to sending visual information to the user. Increased computation amounts require increased processing speed to complete them all on time, which also increases the device power consumption. This reduces device use time and would be a major drawback in any applications where plugging in a device to charge would be a hindrance in completing task(s) that have a required timeframe or deadline.

U.S. Pat. No. 9,063,330 relates to "a method and apparatus for predictive tracking for a head mounted display". The patent does not go into detail about the positioning or placement of the sensors described thereinor how the described systems can address most of the problems described herein.

U.S. patent Ser. No. 11/494,997 describes an AR system capable of displaying "an object with real world dimensions". It is noted that the placement of the various components, as described in the patent, relative to each other and to any potential users, is not discussed. Unlike the eyewear embodiments described in this patent, the invention described herein has no need for a "controller" device to receive an image and perform calculations on the image using data taken from another sensor before placing an image on the display.

U.S. patent Ser. No. 11/461,936 B2 describes a wearable image manipulation and control system for use in AR glasses. This system comprises at least a camera input system, an image projection system, and a processor that communicates with these systems. Almost all the aspects and embodiments in this patent, as well as the specific figures depicting sketches of prototype devices and their sensor, display, and optic placement, appear to require a micro-processor or some other form of computer mediation in order to properly display augmented video over the real world. A lot of embodiments described in this prior art also utilize lenses, which are vulnerable to various types of optical aberration such as those discussed herein.

Therefore, what is missing in the art is a system that is capable of, among other things, gathering information about at least a portion of the surrounding environment, transforming the gathered information into a form that a user is capable of perceiving, and transmitting this transformed information to the user in such a manner that it reduces the effect of and/or solves many of the problems described herein. This system should be usable in various types of devices, including but not limited to those that fall into the categories of night vision, thermal imaging, VR, AR, and MR.

BRIEF SUMMARY OF THE INVENTION

The present invention involves a novel system generally including at least one measurement or sensing device (hereafter referred to as a "sensor") that is capable of taking measurements of the portion of the environment that is visible in its FOV, at least one system that has the capability of processing or transforming measured data from the aforementioned device, and at least one system (which may be incorporated into the previous system or vice versa) that is capable of translating the processed or transformed data from the aforementioned system such that it will be superimposed over various portions of the environment located in the user's FOV, allowing the user to directly or indirectly perceive information about the section of the environment perceived by the sensor or sensors. The capabilities of the elements comprising the present invention are not limited to those described herein and may include others that may or may not be related to those that have already been described.

BRIEF DESCRIPTION OF THE DRAWINGS

Some concepts, configurations, and/or aspects of the present invention are illustrated as an example and are not limited by the FIGS. of the accompanying drawings and equations, which are not necessarily drawn to scale, in which like references may indicate similar elements, and in which:

FIG. 10 may be used to help calculate various design parameters of a mirror that may be used in an information transmission system. FIG. 10 also includes an exploded view that allows for some portions to be more clearly shown.

In FIG. 14A, the information source is denoted by nine points in a rectangular configuration, with a series of parallel rays extending from these points toward a parabolic surface, and another point denoting the vertex of the simulated paraboloid at the intersection. FIG. 14B shows another view, depicting the intersection locations of nine rays (similar to those shown in FIGS. 12A-12E) with the parabolic surface. FIG. 14C depicts the intersection, of both the parallel rays shown in FIG. 14A and the nine diverging rays shown in FIG. 14B, with the parabolic surface. One of the original points is shown in red to help with identifying which points are which.

DETAILED DESCRIPTION OF THE INVENTION

Figure 1A:
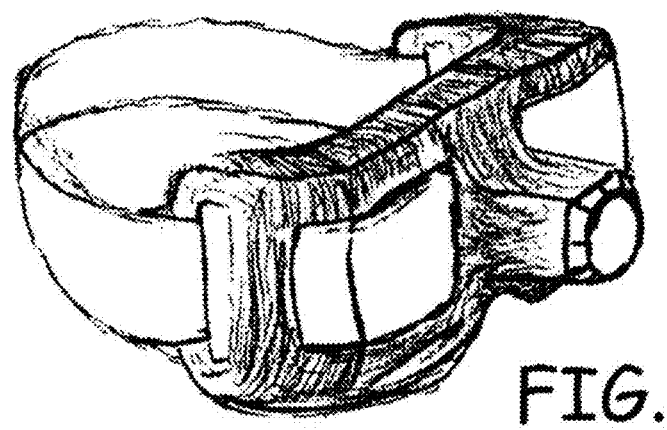
FIG. 1A depicts a sketch of an aspect of the invention that is incorporated into a device, as seen from an orthographic view.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. Headings are provided for convenience only and are not to be construed to limit the invention in any way. Aspects or configurations illustrated under any heading may be combined with aspects or configurations illustrated under any other heading.

The present disclosure is to be considered as an exemplification of the invention and is not intended to limit the invention to the specific aspects illustrated by the figures or description included herein. It has various features that include the following: reduced optical aberration, increased FOV in which the user can perceive additional visual information, and a greatly reduced amount of computational power required to process data and execute other functions.

In the following description, for purposes of explanation, numerous specific details are set forth in order to provide a thorough understanding of the present invention. It will be evident, however, to one skilled in the art that the present invention may be practiced without these specific details.

TERMINOLOGY

The terminology used herein is for the purpose of describing particular aspects only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise.

As used herein, the term "environment" (defined as the surroundings or conditions in which a person, animal, plant, other natural organism, or artificial creation lives, operates, or observes) refers to real-world environments, simulated environments, combinations of real-world and simulated environments, and any other type of environment not listed here. It will be further understood that the terms "comprise", "comprised", "comprises", and "comprising", when used in this specification, specify the presence of stated features, steps, operations, elements, and/or components, but do not preclude the presence or addition of one or more other features, steps, operations, elements, components, and/or groups thereof.

The phrase "at least one of", when combined with a list of items, means a single item from the list or any combination of items from the list. The phrase does not require all of the listed items unless explicitly so defined.

The term "optic" or "optics" means the lens, mirror, or other optical components in an optical apparatus, and the term "optical" means utilizing the properties of light.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Figure 1B:
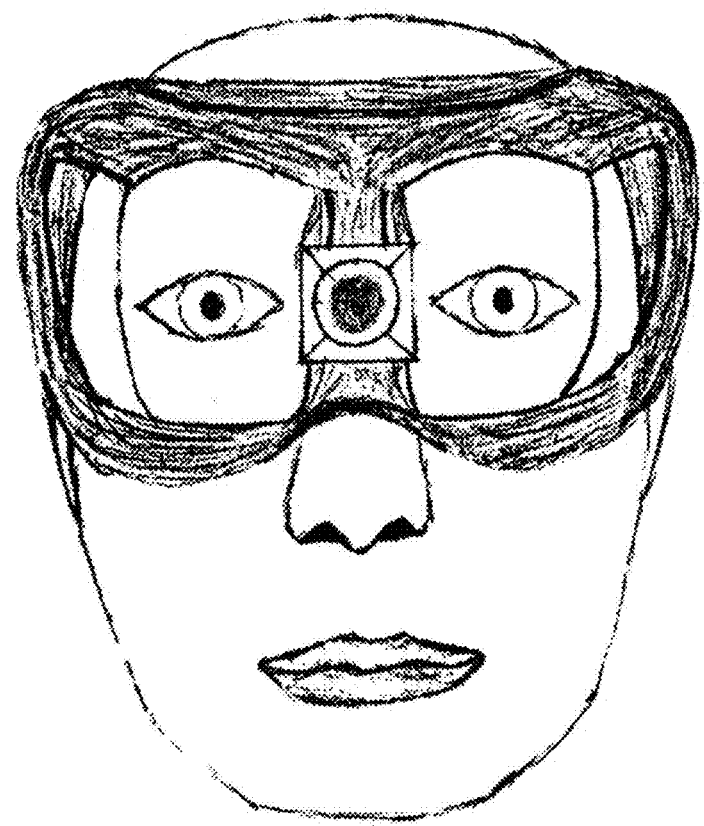
FIG. 1B depicts the device shown in FIG. 1A from a front view as it may appear when worn by a user.

The present invention will now be described by referencing the appended figures. A bi-ocular VR, AR, and/or MR system for measuring information about at least a portion of the surrounding environment and displaying or viewing visual content derived at least in part from the measured information is disclosed herein. The invention may provide information about a portion of the surrounding environment to the user, with the method of presentation depending on the desired functionality. The invention overcomes many of the problems described herein that affect current VR, AR, and/or MR systems. An aspect of a device incorporating the invention is depicted in FIG. 1.

The invention includes at least one sensor system, comprising at least one sensor, which is capable of taking measurements of the portion of the environment that is visible in its FOV. In some aspects, this sensor system comprises multiple sensors or sensor groups. Measurements taken by the sensor system, sometimes referred to as "measured information" or "sensed information", may include the recording, of images and/or video, in any portion of the electromagnetic spectrum, of the portion of the environment within the FOV of the sensor or group of sensors. Examples of other information that may be taken by the sensor system can include measurements of distance, orientation, barometric pressure, altitude, ambient lighting levels, and more, in the physical environment and/or in virtual environments. In other aspects, the placement of the sensor system is a primary factor contributing to the proper operation of the invention described herein. In some aspects, the system should be placed such that the axis of rotational symmetry of the component through which information enters the system intersects with a line that passes through the centers of the user's eyeballs. The axis of symmetry should be oriented such that it is normal to a plane on which the points that make up the surfaces of the user's pupils are coincident with when the user's eyes are unfocused and relaxed in their natural position of rest. While inventions disclosed in prior art may include sensor system(s) placed in a similar orientation, alignment, or location, the designs of these inventions do not rely on the exact placement of their included sensor system(s) to the degree required for the invention disclosed herein.

In other aspects, the invention is designed such that the portion of the user's FOV in which information can be perceived is no greater than the total FOV of the sensor system collecting information about the surrounding environment. The remaining portion or portions of the user's FOV may be used to view other information that may be unrelated to the sensor system. Additionally, in some aspects, the various elements comprising the present invention are configured to reduce data transmission times as much as possible while still retaining the ability to transmit information to the user. Also, in some aspects, the elements of the present invention may be configured such that a complete VR, AR, or MR system utilizing this invention will not require as much computational power needed by existing devices to process and transmit information to a user.

In other aspects, the invention is designed to be easy for a user to use or wear. For example, in aspects of the invention that take the form of a head-mounted device, the weight of various components comprising the invention is one of the factors considered when choosing parts to build the invention. Components that are lighter in weight are often smaller than their heavier counterparts. If smaller components are chosen to build the invention, then the invention would take up a smaller volume of space. Also, if a part is lighter in weight, then a user would be able to expend less strength than the amount required to support a heavier part that would fulfil the same role as the lighter part. Other aspects of the invention are constructed with the goal of distributing the weight of a system around a user. For example, the weight of an aspect of the invention, in the form of a head-mounted device, may be distributed such that its center of gravity is in the same area as a user's head, close to the neck, or the top of the head. This would allow the user to expend less energy when moving or turning, making it easier to keep the device in the required orientation or alignment. Other aspects reduce or distribute their size and/or weight by distributing components over a larger area around the user instead of concentrating them in a few specific locations or using a counterweight.

In another aspect, the invention comprises at least one processing system, whose functions include transforming information into new formats before or during the process of transmitting information from a source to a destination.

In another aspect, the invention comprises at least one information transmission system, whose functions include the capability of transmitting information from one location to another. This system's overall role in the invention involves transforming and conveying information to a user in a format that allows the user to perceive the information directly or indirectly. In some aspects, the design and placement of the components comprising this subsystem relative to the user is highly dependent on the placement of the sensor system relative to the user as described herein.

In VR, AR, and/or MR systems, an information transmission system's functions may include transforming information measured by a sensor system into an electronic format, transforming the resulting electronic information into optical information, and transmitting the resulting optical information to a user. In some aspects of the invention described herein, the portion of the system responsible for transmitting optical information is configured such that the optical information perceived by a user is superimposed over a portion of the environment in the user's FOV, appearing to the user as a "virtual window", through which the user may view this portion of the environment without needing to focus on the window itself to perceive information. The specific location, orientation, and physical dimensions of this "virtual window" is determined by using parameters that may include the sensor system's placement, orientation, and alignment relative to the user. Other parameters that may be used include portions of the sensor's FOV, portions of the user's FOV, and others. In some aspects, the portion of the user's binocular FOV in which the virtual window may be perceived is equivalent in size to the FOV of the sensor system. By rendering information in a "virtual window" instead of as a three-dimensional image or in a stereoscopic display, the invention reduces or eliminates the need for a user to switch their focus between nearby and far-away objects, which should largely mitigate VAC. Also, in some aspects, to more easily produce a "virtual window" for the user to look through instead of focus on, the information transmission system is bi-ocular in nature.

Architecture

Figure 2:
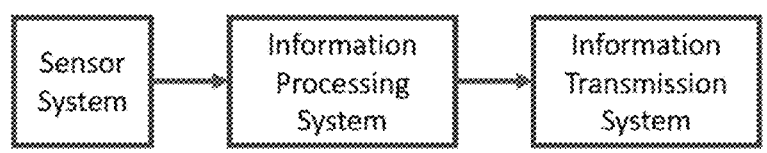
FIG. 2 depicts an aspect of a top-level system architecture of the invention described herein.

The present invention will now be described by referencing the appended figure(s) representing a potential basic system architecture of the invention, as depicted in FIG. 2. In some aspects, the system architecture comprises one or more systems, including a sensor system as described earlier. In some aspects, after gathering data, the sensor system sends the data to a processing system, whose functions include the ability to convert or transform the measured information into a form understandable by a user, and to send the result to an information transmission system as described herein. In some aspects, forms that the converted information take include one or more of the following: the visible portion of the electromagnetic spectrum, acoustics, and tactile feedback. Converted information may sometimes be referred to as "processed information". One possible configuration of this system comprises various elements that include an optical information display device and circuitry required to control and operate said device, allowing the system to produce optical information that a user will be able to comprehend. Information transmitted from a display device is sometimes referred to as "displayed information", "projected information", visual data, or optical data.

Figure 3:
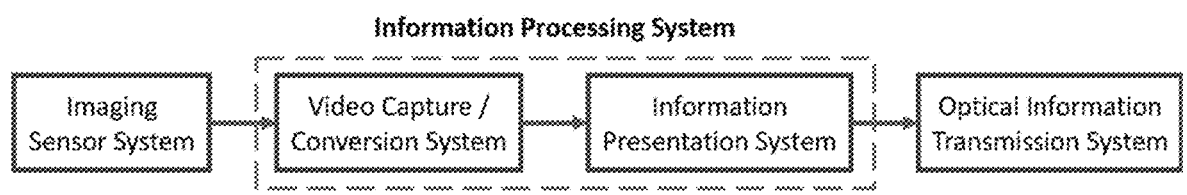
FIG. 3 depicts a more detailed system architecture of an aspect of the invention described herein that breaks down some parts of the top-level system architecture into more detailed subsystems.
Figure 4:
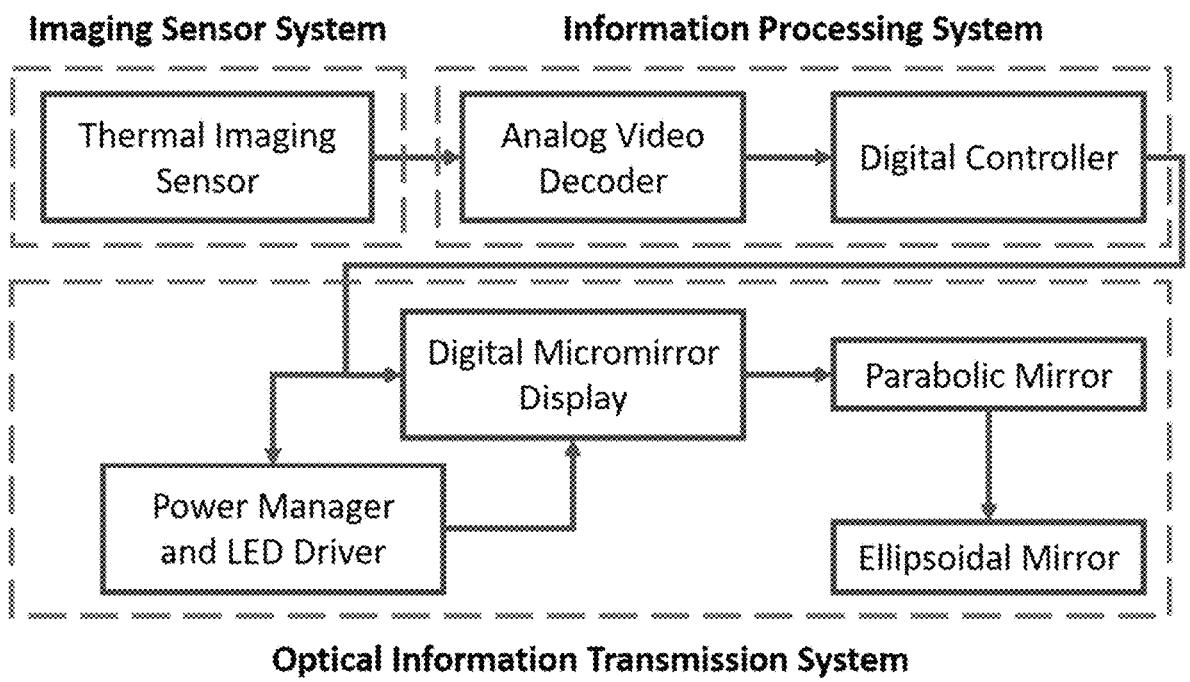
FIG. 4 depicts a system architecture that is a more detailed breakdown of the system architecture depicted in FIGS. 2 and 3, including components that may be used to enable the functionality of the subsystems comprising this invention.
Figure 5:
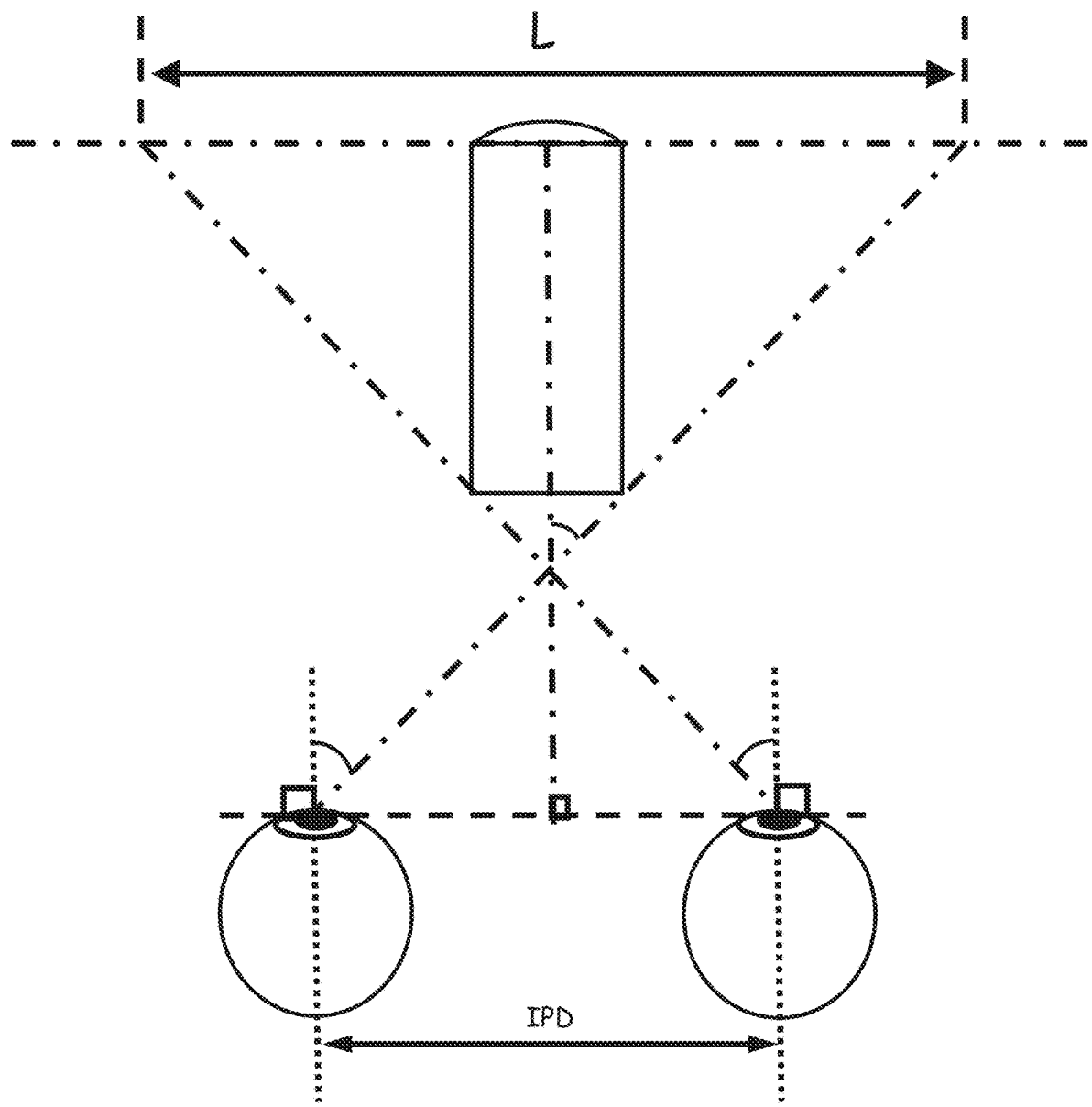
FIG. 5 depicts a top view of one example of a sensor placement in relation to a user's eyes according to various configurations and aspects described herein.
Figure 6:
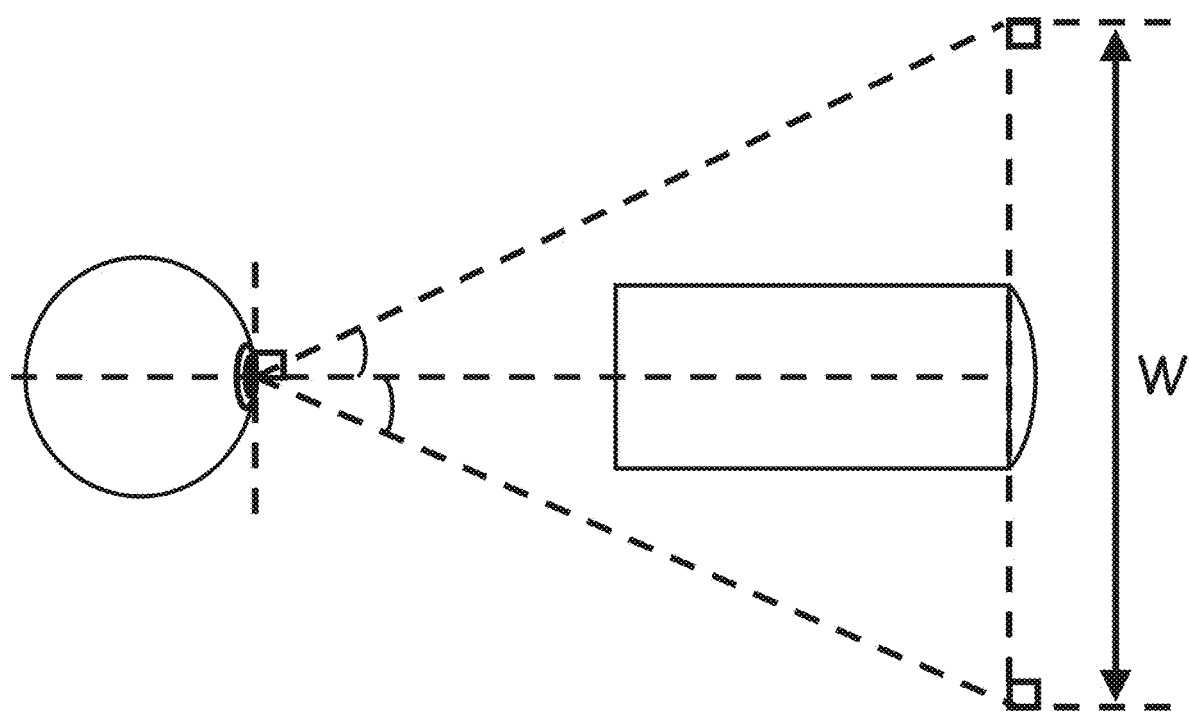
FIG. 6 depicts a right-side view of the same sensor placement depicted in FIG. 5.

FIG. 3 depicts an example of a configuration architecture that includes a breakdown of the aforementioned information processing system. FIG. 4 depicts an example of a configuration architecture that contains a further breakdown of all the systems described so far, and includes specific components that are used to realize the various functionalities of the invention. The physical location of the processing system is not limited by the position of any other systems.

In some aspects, after the information collected by the sensor system is processed into a form that the user is capable of perceiving, it is sent to an information transmission system whose functions include the capability to transmit the processed information to the user such that the user will be able to perceive the information. This system typically comprises one or more transmissive devices. Depending on the medium of transmission, these devices include any form of lenses, mirrors, transducers, transceivers, or other similar devices. In some aspects, the components are designed and placed such that no portion of any component will intersect with any part of the area occupied by the sensor system, nor impede the flow of information to the user.

The invention also comprises circuitry whose roles include interfacing with, enabling the functionality of, and/or comprising portions of the various systems comprising this invention. In some aspects, the circuitry is designed such that it fills only a small volume of space, to make devices incorporating the invention easier to use. The electronics comprising portions of the circuitry may include parts like microprocessors, such as those from the MSP430 series manufactured by TI or the ARM Cortex series manufactured by Arm Holdings, microdisplay systems like those manufactured by Kopin or TI, active components which may include devices like voltage regulators or memory storage, and other active and/or passive components such as resistors, capacitors, and inductors. Components described herein are meant to be non-limiting examples of various aspects that are used to meet the requirements of the invention described herein.

In some aspects, the invention comprises a mounting system whose roles may include enabling the placement of various systems and components according to required, calculated, inferred, or other design parameters. In some aspects, the mounting system includes components like a frame of the kind used in glasses or goggles, mounting arms or brackets, various types of optical component mounts (such as those for lenses or mirrors), or other parts that may require a custom design and may be constructed through processes such as injection molding or additive manufacturing. Any mountings described herein are meant to be non-limiting examples of various aspects that may be used to meet the requirements of the invention described herein.

Details:

The present invention will now be described by referencing the appended figures representing various aspects. In some aspects of the invention, as shown in FIGS. 5-8, a sensor system is placed such that its focusing optical component's axis of rotational symmetry intersects with the midpoint of a line or line segment that intersects with the centers of the user's eyes. Also, the axis of symmetry is oriented such that the direction that the sensor system is aimed is parallel to the direction that a user's eyes look towards when the eyes are unfocused and relaxed in their natural position of rest. In some aspects, the sensor system is small to avoid overt interference with the user's ability to perceive transformed information in calculated dimensions and locations of various parameters and components that comprise the invention's design.

There are many different configurations of a device that can measure information using a sensor, transform the measured information, and transmit the resulting information to a user in a form that the user is able to perceive directly or indirectly. In some aspects, the sensor system is designed to gather information from at least one portion of the electromagnetic spectrum. In one such configuration, the sensor is a device that measures infrared radiation. In some aspects, this sensor is a specific type known as a "thermal imaging sensor", "thermal imaging camera", or "long-wave infrared sensor". Other configurations are possible with different sensors that can measure information in areas that include other portions of the electromagnetic spectrum, various types of electric fields, magnetic fields, and electromagnetic fields, or acoustics. In some aspects, more than one sensor is included in the sensor system. Some examples of these sensors include those that measure information about the user themself or people around them, such as heart rate, blood pressure, muscle activity, brain activity, eye tracking, motion tracking, hand tracking, and location tracking. Other sensor types include those that measure time-of-flight, those that monitor environmental conditions like pressure, humidity, and airflow, and those that gather data for recording interactions with objects in the surrounding environment, whether in the physical environment, a virtual environment, or both.

Figure 7:
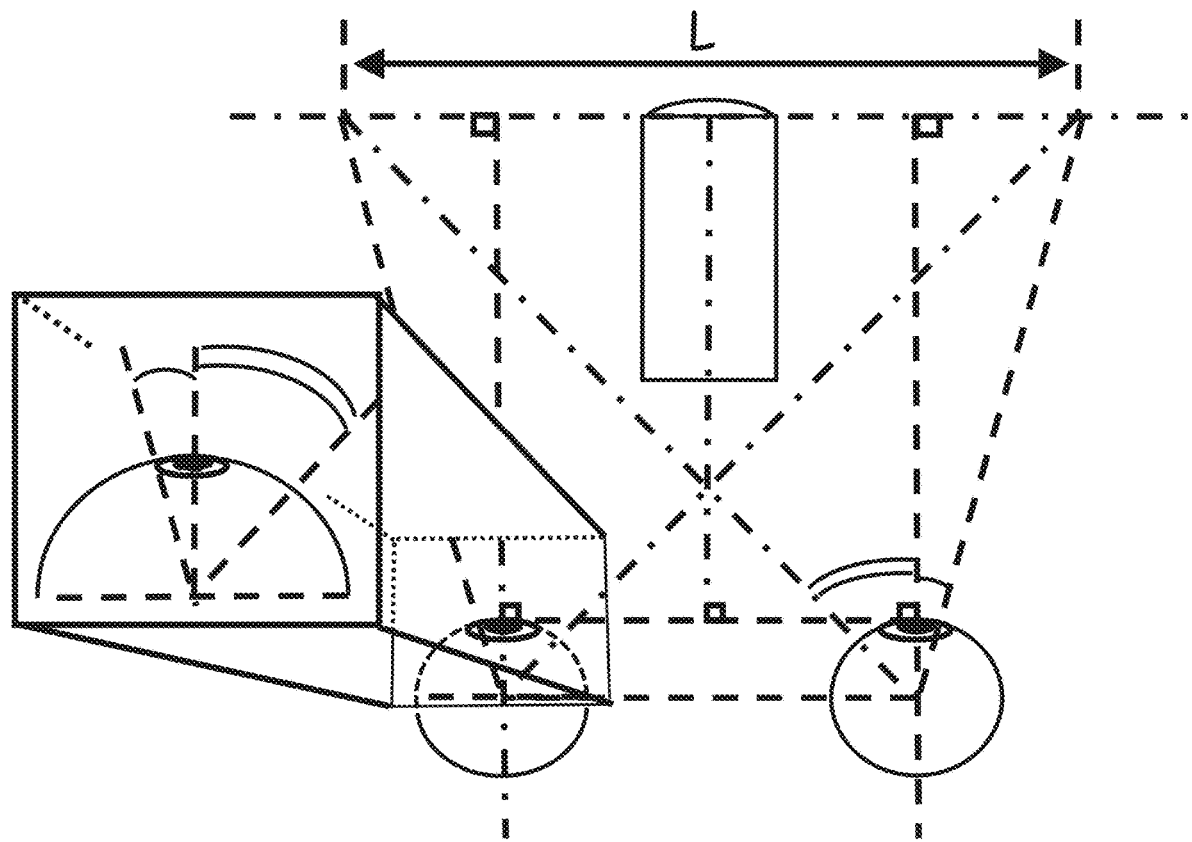
FIG. 7 depicts a top view similar to the one depicted in FIG. 5, but with an exploded view of the area around a user's eye.
Figure 8:
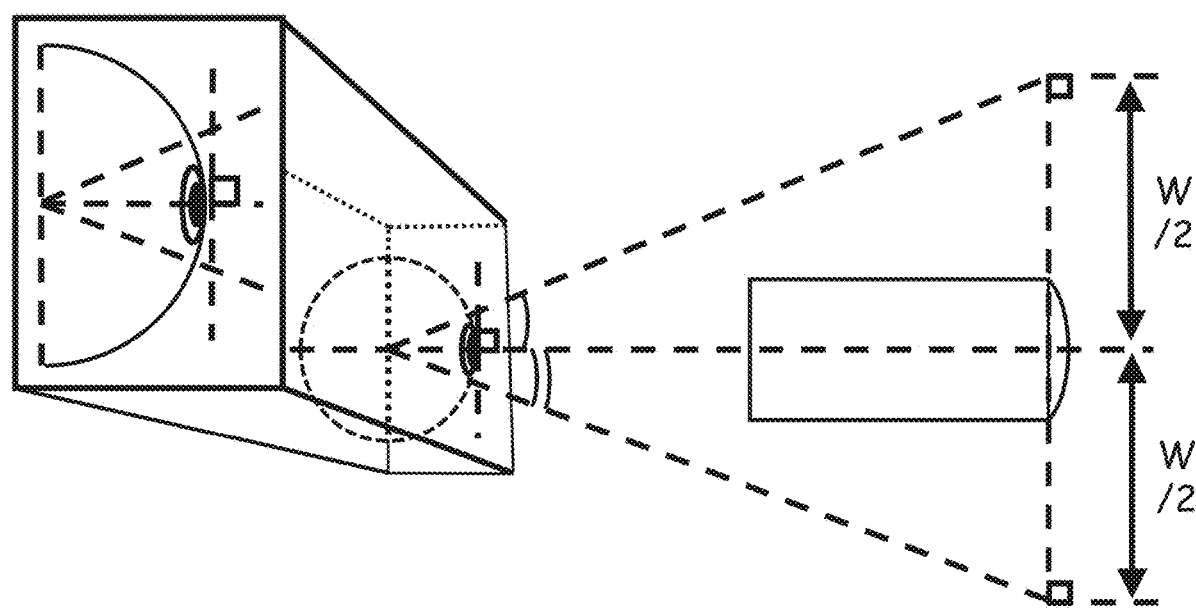
FIG. 8 depicts the same right-side view depicted in FIG. 6, but with an exploded view of the area around a user's eye.

In some aspects, the exact placement of the sensor system, the dimensions of the areas in which information collected by the sensor system may be perceived by the user (hereafter referred to as the "eyebox" or "eyeboxes"), as well as the placement of the eyebox or eyeboxes, may be calculated using various parameters that may include the interpupillary distance (hereafter referred to as "IPD") of the user, the average vertical FOV of the user, the binocular FOV of the user, the horizontal and vertical FOV's of the sensor system, the physical dimensions of the sensor system, the physical dimensions of a "virtual window", and the distance of the portion of the sensor system closest to the user from the vertex of the angle just described. In some aspects, the "virtual window" is the total area from which information appears to be projected onto the eyebox or eyeboxes. In some aspects, the virtual window is positioned such that it is coincident with one end of the sensor system, usually the end where information enters the system. In some aspects, the point of coincidence is in the center of the virtual window, as shown in FIGS. 7 and 8. In other aspects, the point of coincidence is located elsewhere in the window depending on factors like how the sensor system is designed and which portions of the user's FOV it is desired to see superimposed information. FIGS. 7 and 8 also show how an eyebox or eyeboxes may be positioned relative to a user's eye. In some aspects, there is one eyebox positioned in front of each eye of the user, such that each eye will have information superimposed over a portion of its FOV. In some of these aspects, the information is superimposed such that it may appear rendered to the user in three dimensions. Other aspects have only one eyebox positioned in front of only one of the user's eyes.

In some aspects, information collected by a sensor system is sent to a processing system as described herein. Some aspects of the processing system contain a video decoder or converter, designed to convert video information sent by a sensor system from one form into another. For example, in some aspects the video decoder is of a type that converts an analog video feed into digital information. In some aspects, this digital information is sent to a microchip of a type known as a Digital Controller, whose role involves converting the digital information into optical information and outputting it through a photon-emitting device, such that the wavelength and frequency of these emitted photons are in a portion of the visible part of the electromagnetic spectrum. In these aspects, due to the configuration of the sensor system and information transmission system, the Digital Controller has no need to perform any data-manipulating computations before converting the data into optical information. In some aspects, this photon-emitting device is some type of display screen. In other aspects, this photon-emitting device is a series of LEDs oriented to send the emitted photons to a digital micromirror display (DMD) device, which is also controlled by the DMD. In some aspects, the DMD device is controlled by the Digital Controller, and the photon-emitting device is controlled by a specialized "light-engine" microchip (not a microprocessor) which may also be controlled by the Digital Controller. In some aspects, the Digital Controller is the final component of the processing system, sending optical information to a light engine and it's LEDs, as well as a DMD, which use the information to respectively output and reflect light as part of an information transmission system described herein. In other aspects, the DMD and the LEDs are packaged together into a device that is sometimes known as a "pico-projector".

In some aspects, the processing system includes a microcontroller or controller device whose role involves configuring the settings of other components in the processing system. Examples of other components include analog video decoders and digital controllers like those described previously. In some aspects, after the initial configuration of component settings in the information flowpath described between the Sensor, Processing, and Information Transmission Systems, the microcontroller is free to run other computations or interact with other unrelated subsystems as needed. If increased computational power or other functionalities are desired or required for instances of the invention described herein, other devices such as additional sensors, digital signal processors (DSPs), and/or many others may be added to the processing system. In some aspects, these additional devices interface with the microcontroller without disrupting the established information flowpath between the Sensor, Processing, and Information Transmission Systems described herein. In some of these aspects, the microcontroller or controller device has no other role related to the information flow or dataflow between a sensor system, processing system, and information transmission system unless a specific event occurs. In some aspects where a specific event occurs, the microcontroller may have a small role in deactivating the various subsystems comprising this invention to avoid damage that would otherwise be caused by improper shutdown procedures. In some aspects, if desired, information calculated or collected by other devices interfacing with the microcontroller is inserted into the described information flowpath through an established process sometimes known as an "overlay" or a "video overlay", mentioned elsewhere herein.

The components comprising an information transmission system are not limited to those described herein, as there are various components and configurations that may be used to achieve similar or identical results, thus falling under the claims covered by this invention. In some aspects, the information transmission system is directly responsible for conveying the processed and/or transformed information from a processing system to the user. The only requirement for the design of the information transmission system is that some portion of the system must convey information to the user in a form that they may perceive, in a manner that meets the requirements set forth during the design of sensor system aspects described herein and shown in FIGS. 5-14. In some aspects of an information transmission system, the information transmitted from the processing system to the user takes the form of optical information. In some aspects, this optical information is generated using a light engine and DMD as described herein. In some aspects, this optical information is sent to the user by utilizing various different types of mirrors or other reflective or partially-reflective components. In these aspects, one or more of the mirrors used may be of a type known as a parabolic mirror, hereafter referred to as a "paraboloid". The paraboloid may be designed such that transmitted information is reflected off of the paraboloid in such a manner that the information would be constrained to an area whose borders are at least partially delineated by the shape and dimensions of the paraboloid section itself. This type of mirror may also be used to expand or contract the physical dimensions of transformed optical information without directly manipulating the value of any transmitted data.

In some aspects, another mirror that is used in an information transmission system for optical information is an ellipsoidal mirror. In some aspects, this mirror is situated such that it receives information reflected from a parabolic mirror like the one just described. In some aspects, this ellipsoidal mirror's role includes projecting transmitted information directly onto the eyebox of the user. Also in some aspects, this projected information completely fills the portion of the user's FOV that encompasses the eyebox, such that the user will be able to perceive and understand the information. However, the need for this last characteristic depends on the type of information being projected to the user's eyebox. Other aspects use at least one hyperbolic mirror or mirror with a freeform design in conjunction with or in place of other mirrors described herein to give similar or identical results. Some aspects of these configurations are known as a Virtual Retinal Display since the information projected to the user's eyebox in these aspects should then enters the user's eye or eyes and properly land on the eye retina when the eye pupil is aligned correctly. Some aspects of the information transmission system contain two of each optical component described herein, one for each of the user's eyes that the information transmission system is sending information to.

Figure 9:
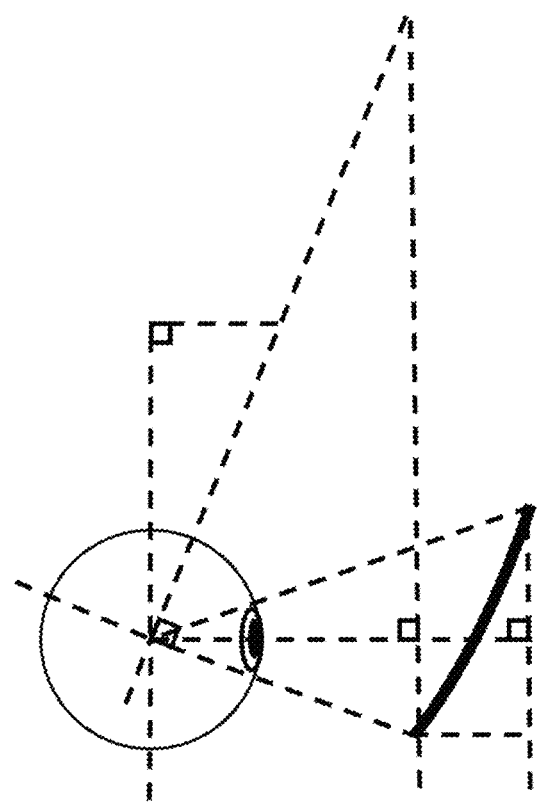
FIG. 9 depicts a right-side view of a user's eye, a cross section of a mirror that may be used in an information transmission system.
Figure 10:
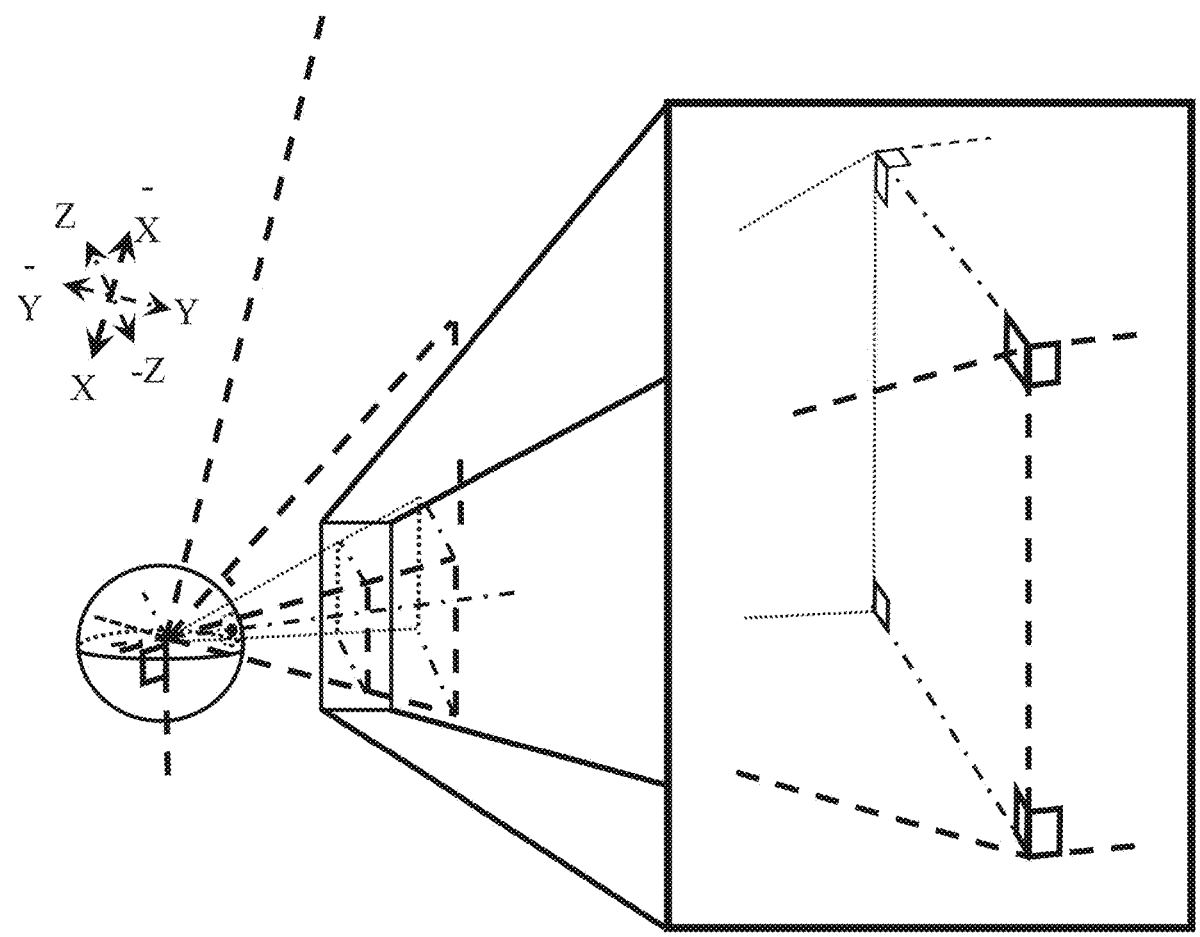
FIG. 10 depicts a right-side view of the user's eye that is rotated and graphically projected onto 3 dimensions according to the cartesian coordinate axes located in the top left corner of the figure.
Figure 11:
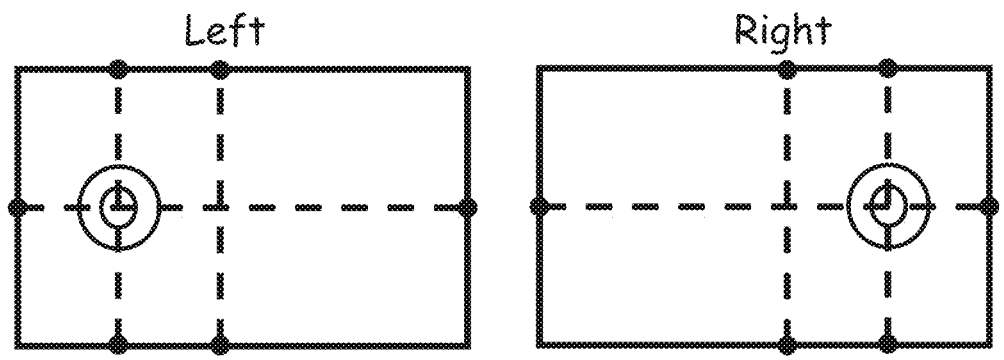
FIG. 11 depicts an exploded view of two eyeboxes, one for each of a user's eyes, divided into sections by dotted lines, as seen from the viewpoint of a user. The dots on the solid line segments denote the intersections of various vectors with the eyeboxes that originate at the centers of the user's eyes. The centers of the two concentric circles in each box are the points where the user's eyes would be directed if the eyes were unfocused and in their natural positions of rest.
Figures 12A, 12B, 12C:
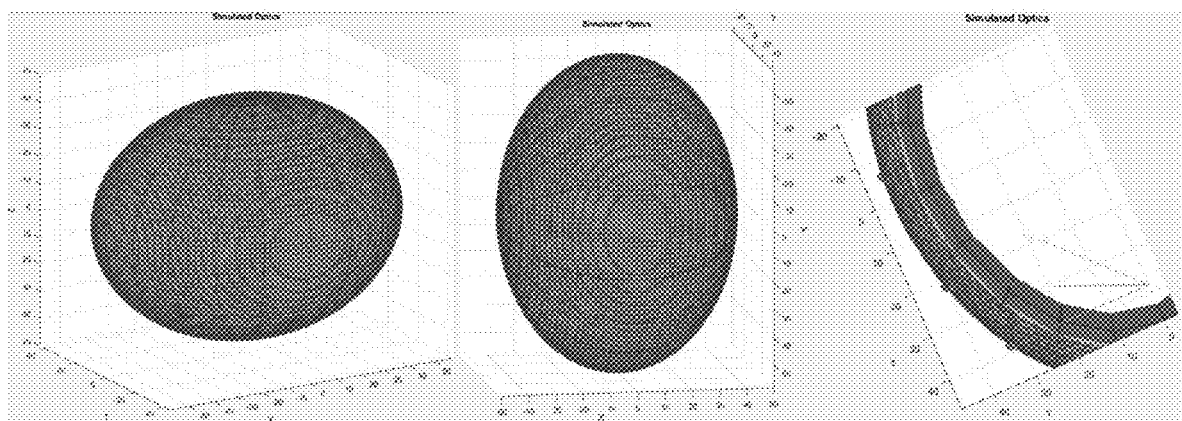
FIGS. 12A-E depicts views of a simulated ellipsoid from various angles. 12A depicts the initial simulation. The pink circles shown in 12B denote the locations where certain vectors originating at one of the ellipsoid focal points intersect with the ellipsoid surface. 12C depicts a zoomed-in view of the interior of the ellipsoid, showing the vectors extending from the ellipsoid focal point towards the ellipsoid surface. If 12C included a user's eye superimposed around the ellipsoid focal point, the eye would be looking towards the ellipsoid surface such that the eye's rotational axis of symmetry would be denoted by the red vector. 12D and 12E depict orthographic views of the ellipsoid interior that include all the vectors intersecting with a corresponding pink circle on the ellipsoid surface.
Figures 12D, 12E:
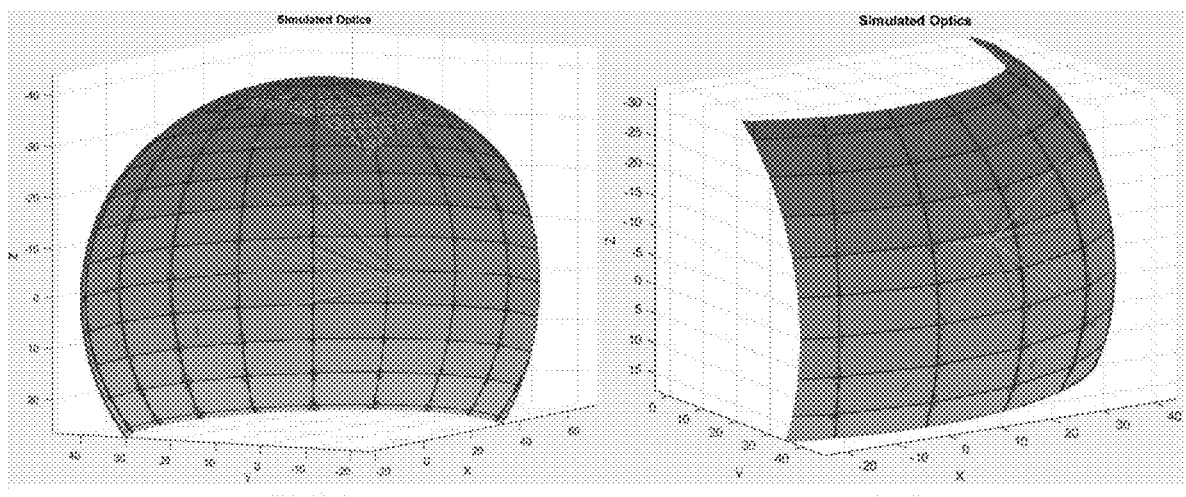
Figures 13A, 13B, 13C:
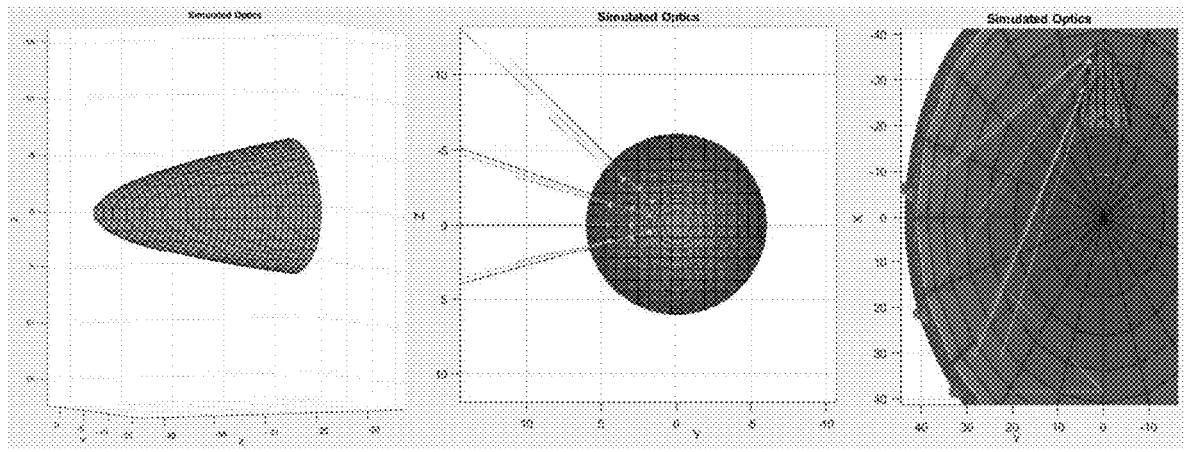
FIGS. 13A-E depicts views of a simulated paraboloid from various angles. 13A depicts an initial simulation. The yellow circles on the paraboloid surface in 13B depict the locations where certain vectors originating at the paraboloid focal point intersect with the surface of the paraboloid. 13C depicts a zoomed-out view of the paraboloid that, in the depicted configuration, is located such that it shares its focal point with one the focal points of the ellipsoid depicted in FIG. 12, as well as sharing its axis of symmetry with the ellipsoid major axis. 13C also shows that, for the configuration depicted in this FIG, the vectors originating at the paraboloid focal point appear to intersect with the same pink circles on the ellipsoid surface depicted in FIG. 12. 13D and 13E depict orthographic views of the paraboloid and ellipsoid to better display the vectors extending out from their respective focal points and show the vectors extending towards their corresponding pink circles on the surface of the ellipsoid.
Figure 13D:
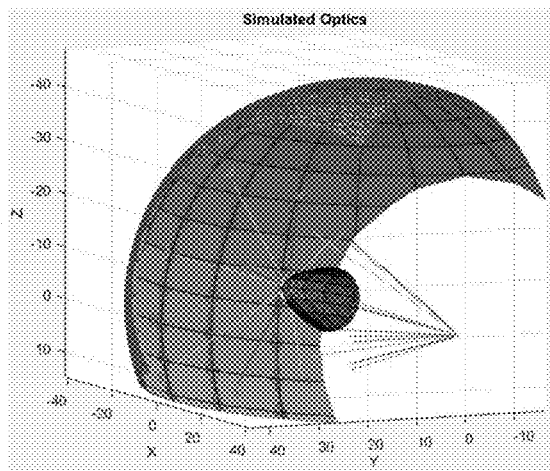
Figure 13E:
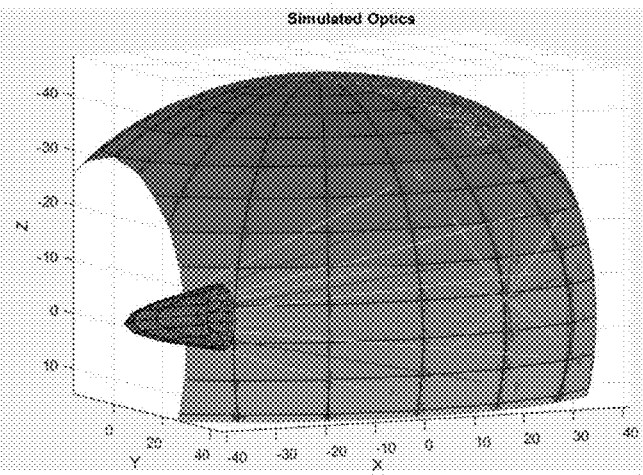

FIG. 9 shows a vertical cross-section of an ellipsoidal mirror, with line segments extending from the ends of said mirror and terminating at the center of a user's eye, to denote the outermost of a set of example paths that optical information takes when reflected off said ellipsoidal mirror, through an eyebox situated just in front of the user's eye and into the user's eye itself. FIG. 10 shows a three-dimensional rendering of how an eyebox appears in front of a user's eye, and FIG. 11 shows how two eyeboxes appear as seen from the viewpoint of a user, assuming the user's left and right pupils are pointing at the center of the concentric circles in the left and right eyeboxes respectively. FIG. 12 shows how transmitted information, sometimes in the form of rays of light, reflects from portions of an ellipsoid to a focal point and vice versa. In some aspects, the placement of the ellipsoid relative to the user is inferred such that the user's eye intercepts the reflected rays. Sets of example rays extending from the focal point of a paraboloid are shown in FIG. 13 to depict locations where transformed information reflects from a parabolic surface during its transmission to the user's eye. In some aspects of an information transmission system, a type of surface sometimes referred to as a "freeform" surface is used for the design of any optical component in the system. These surfaces are often used to attain greater precision in focusing optical components, but they are very costly to develop and difficult to design.

Figure 14A:
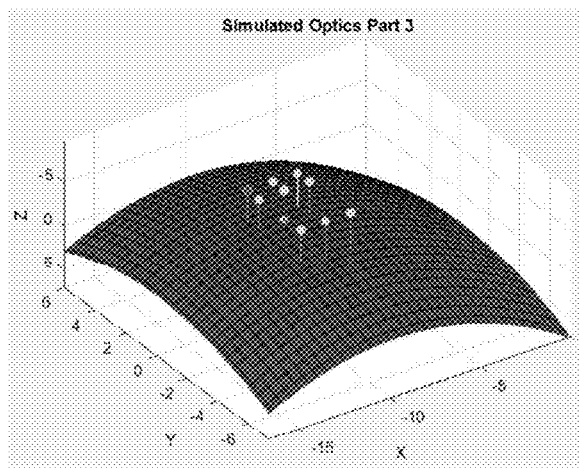
FIGS. 14A-C depicts a view of a simulated parabolic surface that may be used to transform information sent from a display system such that it fills an area denoted by vectors originating at a focal point and extending to a quadric surface. An example of these vectors can be seen in FIGS. 12A-12E.
Figure 14B:
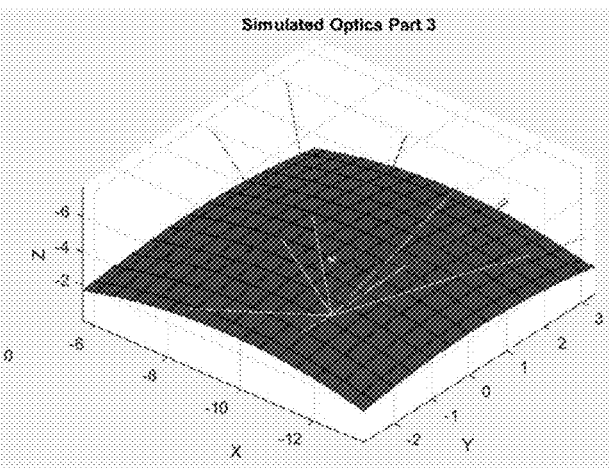
Figure 14C:
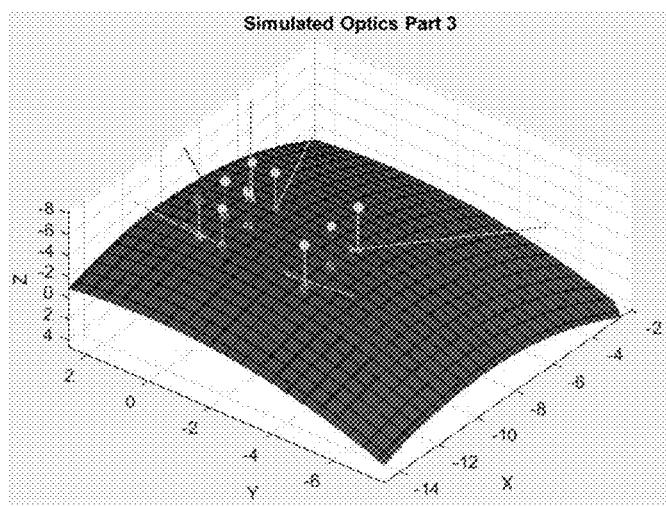

There are several methods of translating information from a processing system to an information transmission system. In some aspects, the processing system converts received information from its previous format into a new format, such as optical information and sends the information to the information transmission system through a series of optical components like those described earlier, which may be scaled up or down in size as required. In some aspects, these components are oriented such that they reflect the information to the area on the original parabolic mirror described earlier. Components in these aspects may be of any shape, including those of conic sections, spherical sections, or planar sections. An example simulation of a section of a parabolic mirror (a type of conic section), and its interactions with rays emanating from a potential display system, is shown in FIG. 14. While mirrors are not the only means by which transformed information is transmitted to the user, using only mirrors in designing aspects of the invention where transformed and transmitted information is optical in nature reduces or removes most of the optical aberrations described earlier.

Other configurations may not use a series of mirrors to transmit information. Instead, in some aspects, one or more systems is configured to "warp" the processed and rendered information before transmitting it. In these configurations, to "warp" an image is to map pixels from the processed and rendered information to corresponding pixels in an area of a specific size and/or shape. In aspects where information must be warped before transmission, the information transmission system needs to be designed such that it will also "unwarp" the transmitted information into a form that the user can comprehend. In some aspects, the mapping in question is to the area delineated by various parameters of components used in an information transmission system. In some aspects, the process used to warp the information is of a physical nature, using certain components that may include those of the types described herein. More often, image warping is of a non-physical nature, comprising one or more algorithms whose functions include the digital manipulation of information captured by a sensor system. In some aspects, warping processes include a combination of both physical and non-physical steps. In a processing system, for aspects that may utilize warping, the outer boundaries of the area encompassing the warped information may be denoted by certain parameters derived or calculated for other parts of these aspects.

Although the present invention has been illustrated and described herein with reference to possible aspects, configurations, and specific examples thereof, it will be readily apparent to those of ordinary skill in the art that other configurations, aspects, and examples may perform similar functions and/or achieve like results. All such equivalent configurations, aspects and examples are within the spirit and scope of the present invention, are contemplated thereby, and are intended to be covered by the following claims.

REFERENCES CITED

U.S. Pat. No. 6,219,186 B1 Apr. 17, 2001: Compact Biocular Viewing System for an Electronic Display
2004/0004584 A1 Jan. 8, 2004: Head-mounted viewing system for single electronic displays using biocular lens with binocular folding mirror
U.S. Pat. No. 6,945,648 B2 Sep. 20, 2005: HMD Device
U.S. Pat. No. 9,063,330 B2 Jul. 23, 2015: Perception Based Predictive Tracking for Head Mounted Displays
U.S. Pat. No. 9,170,425 B1 Oct. 27, 2015: Multifocal Augmented Reality Lens
U.S. Pat. No. 9,250,444 B2 Feb. 2, 2016: Head Mounted Display Device
U.S. Pat. No. 9,494,800 B2 Nov. 15, 2016: See-through Computer Display Systems
2018/0,268,518 A1 Aug. 20, 2018: Mixed Reality System with Virtual Content Warping and Method of Generating Virtual Content Using Same
U.S. Pat. No. 10,054,774 B2 Aug. 21, 2018: Five-Mirror Afocal Wide Field of View Optical System
2019/0025587 A1 Jan. 24, 2019: AR Glasses with Event and User Action Control of External Applications
2019/0,204,601 A1 Jul. 4, 2019: Augmented Reality Optics System with Pin Mirror
2019/0,339,515 A1 Nov. 7, 2019: Expanding a Pupil Using Replication
U.S. Pat. No. 1,1461,936 B2 Oct. 4, 2022: Wearable Image Manipulation and Control System with Micro-Displays and Augmentation of Vision and Sensing in Augmented Reality Glasses
U.S. Pat. No. 11,494,997 B1 Nov. 8, 2022: Augmented Reality System with Display of Object with Real World Dimensions

The invention claimed is:

1. A virtual reality, augmented reality, or mixed-reality head-mounted viewing system, comprising:
   (a) a sensor system that is placed in front of a user's eyes on a virtual plane that passes through both the sensor system and centers of the user's pupils, such that the user's eyes are divided into sections that are symmetric across the plane, comprising:
      i. at least one sensing device configured to measure the surrounding environment using a portion of the electromagnetic spectrum;
      ii. at least one sensing device configured to measure the surrounding environment using a portion of the acoustic spectrum; or
      iii. a combination of (a) and (b);
   (b) a processing system configured to perform computations on information or data to transform or convert the data from one format to another format, without directly manipulating specific values of the data;
   (c) an information transmission system configured to transmit measured or sensed information, processed information, displayed information, projected visual content, or a combination thereof from at least one system or location to another, such that the information is presented over at least a portion of the real-world environment being perceived by a user, which reduces or eliminates the need for extra information computations or transformations that would otherwise be required by a user to perceive or understand the information;
   (d) a power supply, configured to provide energy to components of the viewing system; and,
   (e) a mounting apparatus, configured to attach directly or indirectly to the components of the viewing system and configured to mount the viewing system onto the user.

2. The viewing system of claim 1, wherein the viewing system is configured as a bi-ocular system.

3. The viewing system of claim 2, wherein optical components are placed to transmit visual information to both eyes of the user.

4. The viewing system of claim 3, wherein the optical components are located on each side of the bi-ocular viewing system, are reflective or partially reflective, and are:
   a) in the shape of a conic section; or
   b) in the shape of a spherical section; or
   c) in the shape of a freeform section; or
   d) in the shape of a planar section; or
   e) a combination of two, three, or all four of (a)-(d).

5. The viewing system of claim 4, wherein an information transmission system is located on each side of the bi-ocular viewing system and each information transmission system comprises a series of optical components.

6. The viewing system of claim 5, wherein at least one optical component located in each information transmission system is placed in front of the user's eyes such that:
   (a) the field of view (FOV) of the user in which transmitted information can be perceived is no greater than the FOV of the sensor system from which said information originated;
   (b) the outer edges of the optical components located on each side of the bi-ocular viewing system intersect with the outer borders of the FOV of the user in which transmitted information can be perceived; and
   (c) the portions of the measure of a vertical FOV of the user, in which information can be perceived, that are perpendicular to and bisected by a virtual plane passing through the centers of the user's pupils such that the user's eyes are divided into sections that are also symmetric across the plane, are equivalent.

7. The viewing system of claim 1, wherein the viewing system is configured as a monocular system.

8. The viewing system of claim 7, wherein optical components are placed to transmit visual information to only one of the user's eyes.

9. The viewing system of claim 1, wherein:
   a) the at least one sensing device configured to measure the surrounding environment using a portion of the electromagnetic spectrum is a thermal imaging camera; or
   b) the at least one sensing device configured to measure the surrounding environment using a portion of the acoustic spectrum is a microphone or series of microphones; or
   c) the at least one sensing device configured to measure the surrounding environment using a portion of the electromagnetic spectrum is a camera or other image sensor, where the portion of the electromagnetic spectrum measured is in the infrared spectral band; or
   d) the at least one sensing device configured to measure the surrounding environment using a portion of the electromagnetic spectrum is a camera or other image sensor, where the portion of the electromagnetic spectrum measured is the visible spectrum of light; or e) a combination of (a), (b), (c), and/or (d).

10. The viewing system of claim 1, where the sensor system:
   (a) is oriented such that the vertex of its field of view (FOV) and the vertex of the user's binocular FOV both lie on the same plane; or
   (b) is oriented such that the vertex of its FOV and the vertex of the user's monocular FOV both lie on the same plane.

11. The viewing system of claim 10, where the sensor system is oriented such that the center axis of its FOV is perpendicular to a line, line segment, or ray that extends between and/or through the location where the centers of the user's eyes are found.

12. The viewing system of claim 11, where the sensor system is:
   (a) placed equidistant from the centers of the user's eyes; or,
   (b) is placed directly in front of at least one of the user's eyes.

13. The viewing system of claim 1, wherein the information transmission system, comprises:
   (a) an image projection system; and,
   (b) at least one reflective or partially reflective optical component.

14. The viewing system of claim 13, wherein:
   (a) the at least one reflective or partially reflective optical component is in the shape of a conic section;
   (b) the at least one reflective or partially reflective optical component is in the shape of a spherical section;
   (c) the at least one reflective or partially reflective optical component is in the shape of a planar section;
   (d) the at least one reflective or partially reflective optical component is in the shape of a freeform surface; or
   (e) a combination of two, three, or all four of (a)-(d).

15. The viewing system of claim 14, wherein:
   (a) the at least one reflective or partially reflective optical component is in the shape of an ellipsoid;
   (b) the at least one reflective or partially reflective optical component is in the shape of a paraboloid;
   (c) the at least one reflective or partially reflective optical component is in the shape of a hyperboloid; or
   (d) a combination of two or three of (a)-(c).

* * * * *